United States Patent [19]
Fujima

[11] Patent Number: 5,476,427
[45] Date of Patent: Dec. 19, 1995

[54] PACE DISPLAY DEVICE

[75] Inventor: Mikako Fujima, Fussa, Japan

[73] Assignee: Casio Computer Co., Ltd., Tokyo, Japan

[21] Appl. No.: 309,126

[22] Filed: Sep. 20, 1994

[30] Foreign Application Priority Data

Sep. 30, 1993 [JP] Japan .................................. 5-244802

[51] Int. Cl.⁶ .................................................. G01C 22/00
[52] U.S. Cl. .................................... 482/3; 482/7; 482/74; 482/901
[58] Field of Search ................................. 364/550, 561, 364/565; 482/1–9, 51, 74, 900–902; 377/19, 24.2

[56]        References Cited
           U.S. PATENT DOCUMENTS

4,220,996  9/1980  Searcy ........................ 482/3 X
4,334,190  6/1982  Sochazevski ................. 482/3 X
4,408,183  10/1983 Wills ............................ 482/3 X
4,962,469  10/1990 Ono et al. .................... 364/561
5,164,967  11/1992 Endo et al. ................... 377/24.2

Primary Examiner—Richard J. Apley
Assistant Examiner—Glenn E. Richman
Attorney, Agent, or Firm—Frishauf, Holtz, Goodman, Langer & Chick

[57]            ABSTRACT

When a lap switch is operated, data of a lap time stored in a register T is stored in a lap register pointed out by a pointer PR. An average pace for a section of a course is calculated on the basis of data of a step count for that section stored in a register H and data on the lap time for that section stored in the register T. Data on a calculated average pace is stored in a lap register. A pace difference between the present and the immediately preceding average pace is calculated and data on the pace difference is stored in an appropriate lap register. Thereafter, the pointer PR is incremented by one.

6 Claims, 8 Drawing Sheets

| | | |
|---|---|---|
| R0 → | 145 | 00 : 10  30 | |
| R1 → | 150 | 00 : 19  21 | +5 |
| R2 → | 140 | 00 : 21  45 | -10 |

PACE DISPLAY DEVICE

BACKGROUND OF THE INVENTION

1. Field of the Invention

The present invention relates to a pace display device which is worn by a person who does a running or jogging, calculates the person's pace on the basis of data on a step count which the person had during the running or jogging, and displays data on the pace.

2. Description of the Related Art

It is important for a person who does a running or jogging to know his or her step count or pace which the person had during the running or jogging in order to take exercise deliberately.

To this end, pace display devices have been realized which calculate the pace of a person who does a running or jogging on the basis of the step count which the person had during the running or jogging.

Some conventional pace display devices measure a lap time for each of sections of a running course, and stores and displays data on the lap times.

The pace of running or jogging herein is defined as the step count per given time, generally, per minute, which the runner has.

When a pace is calculated in the conventional device, the step count of a runner measured for a time shorter than one minute is reduced to that per minute. For example, a step count for 20 seconds is calculated and multiplied by three to provide data on the pace.

Thus, when data on the step count sensed by a sensor or the like involves an error, this error would be amplified when the sensed step count is reduced to that per minute and hence no data on a correct pace could not be obtained.

In order to improve the accuracy of a pace to be obtained, this pace could be calculated from the actual step count which the runner had for a minute. If the time for which the step count is measured increases, however, the runner's pace can change in that time. In that case, the display of the pace data would not follow a change in the actual pace.

If in running or jogging the difference between the present and the immediately preceding paces or the difference between the paces for adjacent sections of the running course is known, it is effective for analysis of the contents of the runner's running or jogging. However, there are no conventional devices which calculate such pace difference and display data on the pace difference.

SUMMARY OF THE INVENTION

The present invention is made in view of the above problems.

It is an object of the present invention to provide a pace display device capable of displaying data on a pace (a step count per given time) difference.

It is another object of the present invention to provide a pace display device capable of following a change in the pace in a short time and displaying data on a accurate pace.

In order to achieve those objects, the present invention provides a pace display device including:

step count sensing means for sensing data on a step count;

pace calculating means for calculating a pace from the data on a step count sensed by the step count sensing means;

pace difference calculating means for calculating the pace difference between the present and the immediately preceding paces calculated by the pace calculating means;

storage means for storing data on the pace and data on the pace difference; and display means for displaying data on the pace and data on the pace difference stored in the storage means.

According to such structure of the inventive pace display device, data on the difference between the present and the immediately preceding paces is displayed, so that the runner is able to know how high or low the present pace is compared to the immediately preceding pace.

In order to achieve the above objects, the present invention provides a pace display device including:

step count sensing means for sensing data on a step count for each of sections of a running or jogging course;

timekeeping means for measuring a lap time for that section;

pace calculating means for calculating an average pace for that section on the basis of data on the step count for that section sensed by the step count sensing means and data on the lap time for that section measured by the timekeeping means;

first storage means for storing data on the average pace calculated by the pace calculating means;

pace difference calculating means for calculating the pace difference between the average paces for two adjacent sections of the course stored in the first storage means, one of the two adjacent sections being that section;

second storage means for storing data on the pace difference calculated by the pace difference calculating means; and display means for displaying data on the average pace stored in the first storage means and data on the pace difference stored in the second storage means.

According to such structure of the inventive pace display device, data on an average pace through a section of the running course and data on the difference in average pace between that section and an adjacent section are displayed. Thus, the contents of the running or jogging can be analyzed by comparison of the average pace of each section and the difference in average pace between that section and the adjacent section when the measurement is completed.

In order to achieve the above objects, the present invention provides a pace display device including:

step count sensing means for sensing data on a step count;

a plurality of step count storage means each for storing data on a step count sensed by the step count sensing means;

data writing means for sequentially and repeatedly writing data items on step counts, sensed sequentially by the step count sensing means for the respective equal time divisions of a given time which are equal in number to the step count storage means, into said respective storage means;

pace calculating means for calculating a pace from data items on the step counts stored in the respective step count storage means; and display means for displaying data on the pace calculated by the pace calculating means.

According to such structure of the inventive pace display device, the pace is calculated from data on the step counts stored in the plurality of step count storages. Thus, even when errors are involved in data on the sensed step counts, they are not amplified, and hence data on an accurate pace is displayed.

DETAILED DESCRIPTION OF THE PREFERRED EMBODIMENT

One embodiment of the present invention will be described with respect to the accompanying drawings.

Figure 1:
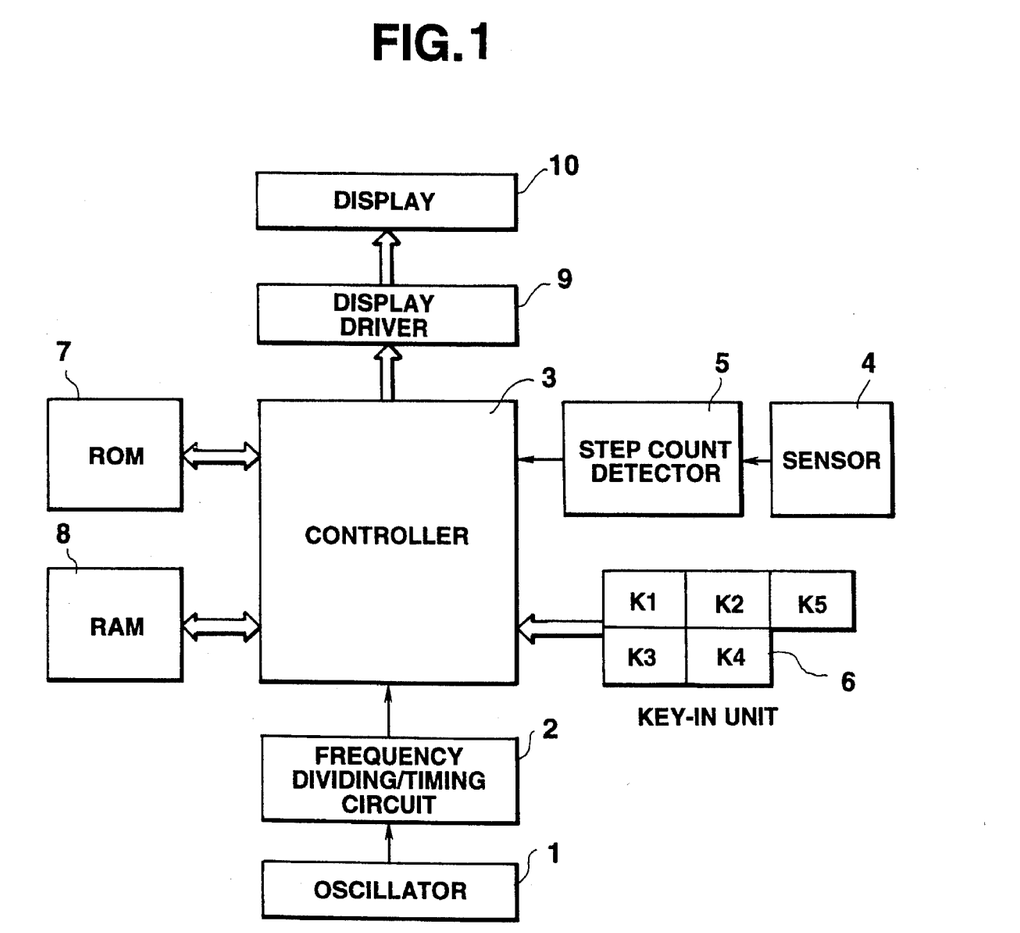
FIG. 1 is a block diagram of the circuit of a pace display device as an embodiment of the present invention.

FIG. 1 is a block diagram of the circuit of the pace display device as the embodiment of the present invention. This embodiment shows application of the present invention to an electronic wrist watch with a pace display function.

In FIG. 1, a reference clock signal generated by an oscillator 1 is frequency-divided by a frequency dividing/timing circuit 2. The resulting signal is converted to a time recording signal as a reference for time measurement and timing signals as references for the respective operations of the circuit elements, and outputs to a controller 3.

A sensor 4 includes an acceleration sensor or the like which senses the acceleration of a runner when the runner swings his arms. The waveform of a sensing signal output from the sensor 4 is shaped by a step count detector 5 and then outputs as a step count detection signal to the controller 3. A key-in unit 6 includes a key K1 which selects one of a time display mode and a stopwatch mode; a key K2 which starts or stops the stopwatch measurement; a key K3 which stores data on a lap time; a key K4 which displays the difference between paces during lap time measurement; and a key K5 which displays the stored data. Operational signals from those keys are output to the controller 3.

The controller 3 includes a central processing unit (CPU) which performs a timekeeping process, a stopwatch process, a lap process, a pace difference process and a data display process, and stores time data, lap time data, pace data calculated in those processes in respective registers of a random access memory (RAM) 8 in accordance with a control program stored in a read only memory (ROM) 7. The controller 3 reads time data, lap time data, etc., from the RAM 8 and displays those data through the display driver 9 on the display 10.

Figure 2:
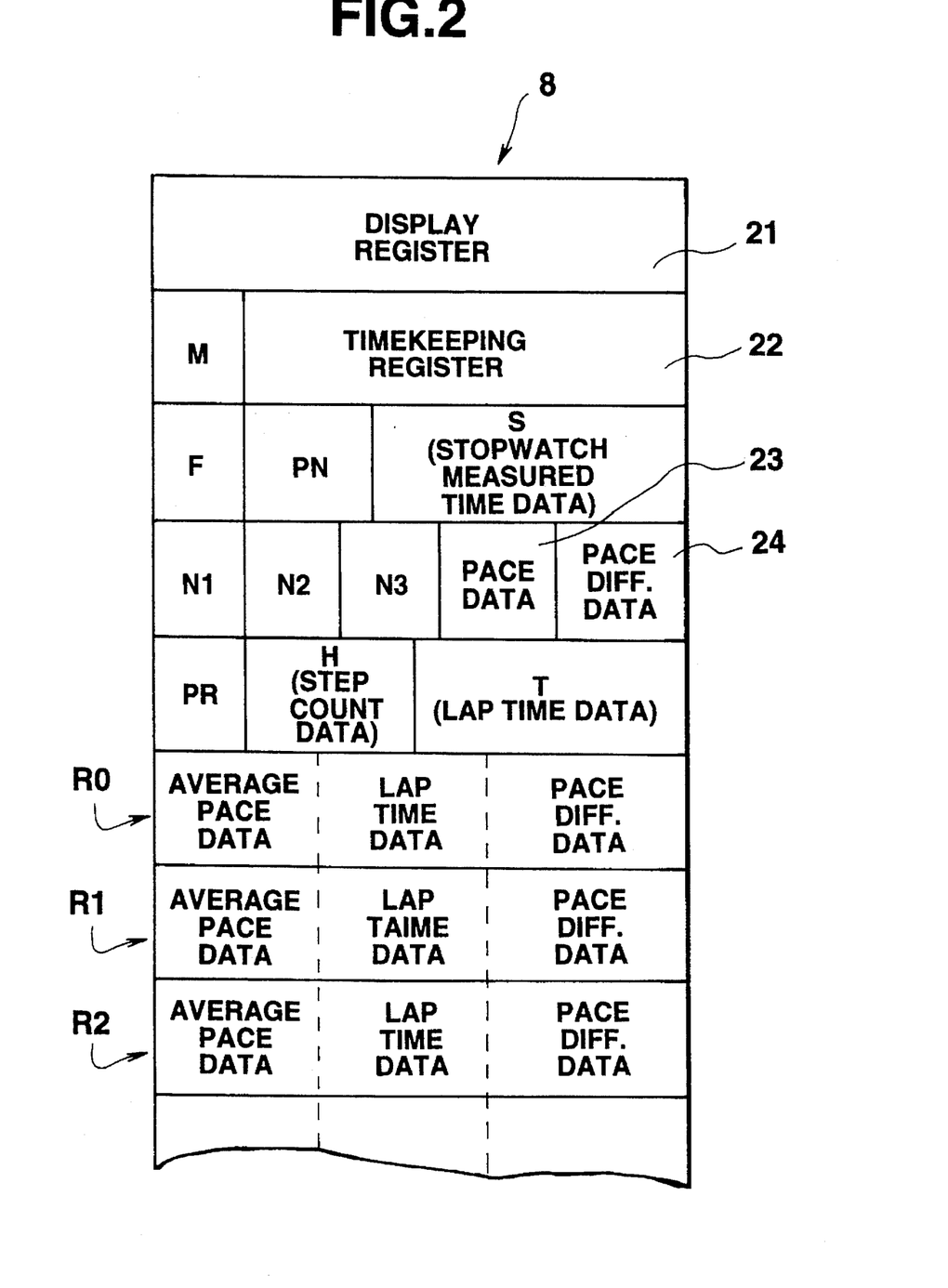
FIG. 2 shows the structure of a RAM of the pace display device.

The structure of the RAM 8 which includes registers will be described with reference to FIG. 2. A display register 21 of the RAM 8 stores data to be displayed on the display 10. A timekeeping register 22 stores data on a date and time recorded in the timekeeping process to be described later.

A mode register M stores data on a numerical value corresponding to an operational mode. In a time display mode, the mode register M stores "0" while in a stopwatch mode the mode register M stores "1". A flag F displays whether the mode is a stopwatch measurement mode. In the stopwatch measurement the flag F stores "1" while in the non-stopwatch measurement the flag F stores "0". A stopwatch register S stores data on the time elapsed since the start of the stopwatch measurement.

A register N1 stores data on a step count of the runner for a first 20-second time division of a given time; a register N2 stores data on a step count for the next 20-second time division; and a register N3 stores data on a step count for the further next 20-second time division. A pointer PN points out one of the registers N1, N2 and N3.

A register H stores data on a step count under the present measurement. A register T stores data on a lap time under the measurement. A register 23 stores data on a pace calculated from data on step counts stored in the registers N1, N2 and N3. A register 24 stores data on the pace difference between the average pace for the immediately preceding lap time and the pace, data on which is stored in the register 23.

A plurality of registers R0, R1, R2, . . . , each stores data on an average pace through each of sections of the running course, data on a lap time (for that section) and data on the difference in pace between the that section and the section immediately preceding that section. A pointer PR points out one of the registers R0, R1, R2, . . . The above data items stored in the corresponding registers R0, R1, R2, . . . are for the sequentially adjacent sections or nonadjacent sections of the running or jogging course.

Figure 3:
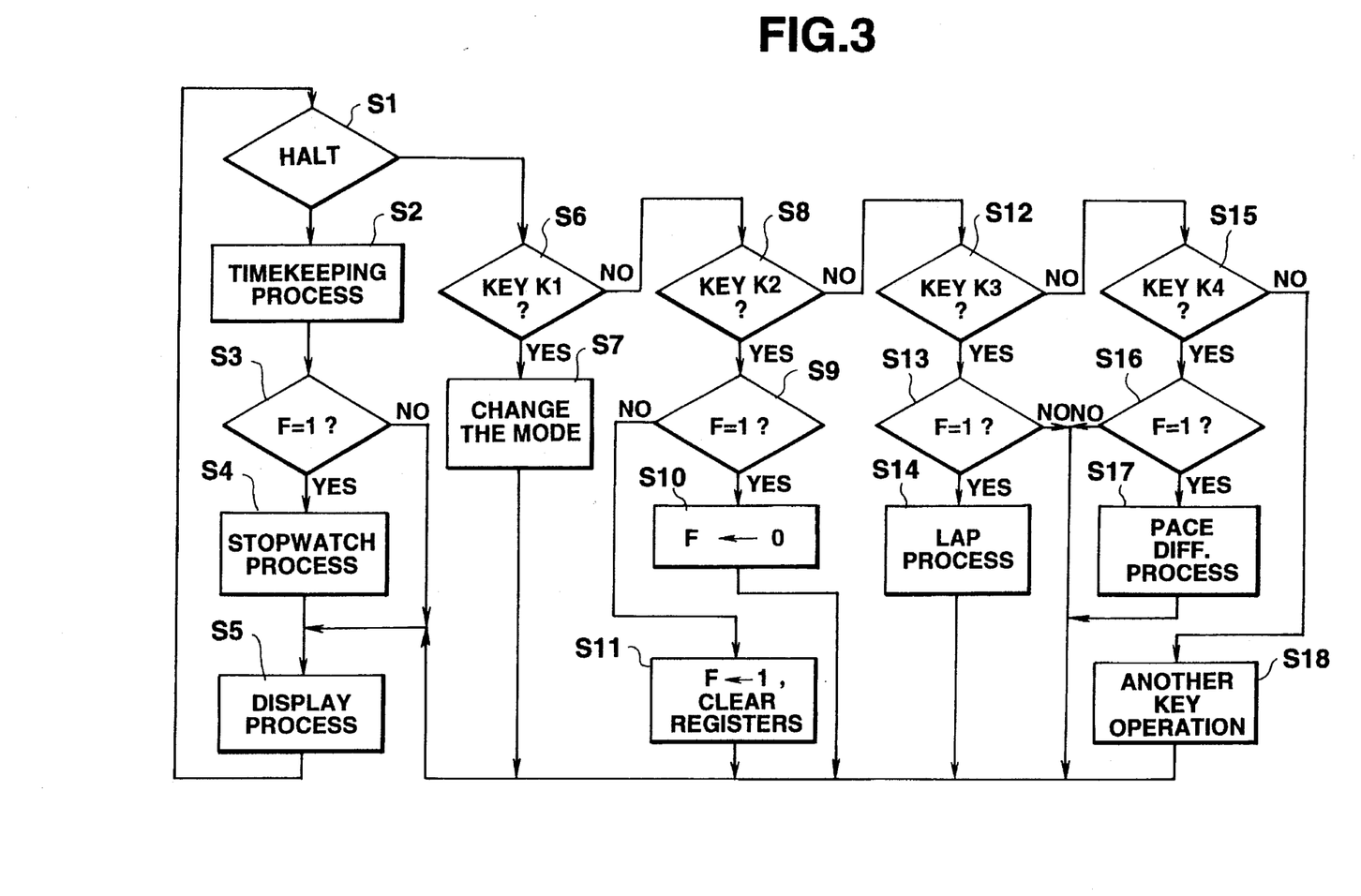
FIG. 3 is a flowchart indicative of the whole operation of the pace display device.

The whole operation of the pace display device having the above structure will be described with reference to a flowchart of FIG. 3.

When the controller 3 performs no processes, it is in a halt state at step S1. When the controller 3 senses a timekeeping signal as a reference for a timekeeping operation, control passes to a timekeeping process at step S2. When the controller 3 senses a key operation signal, control passes to a key K1 determination process at step S6.

As just described above, when the controller 3 senses a timekeeping signal in its halt state, control passes to the timekeeping process at step S2, where the controller 3 counts the timekeeping signal to update data on the current date and time and stores the updated data into the timekeeping register 22. At step S3 the controller 3 determines whether the flag F is "1". If so (the stopwatch measurement is being performed), control passes to a step S4 where the controller 3 performs the stopwatch process.

Figure 4:
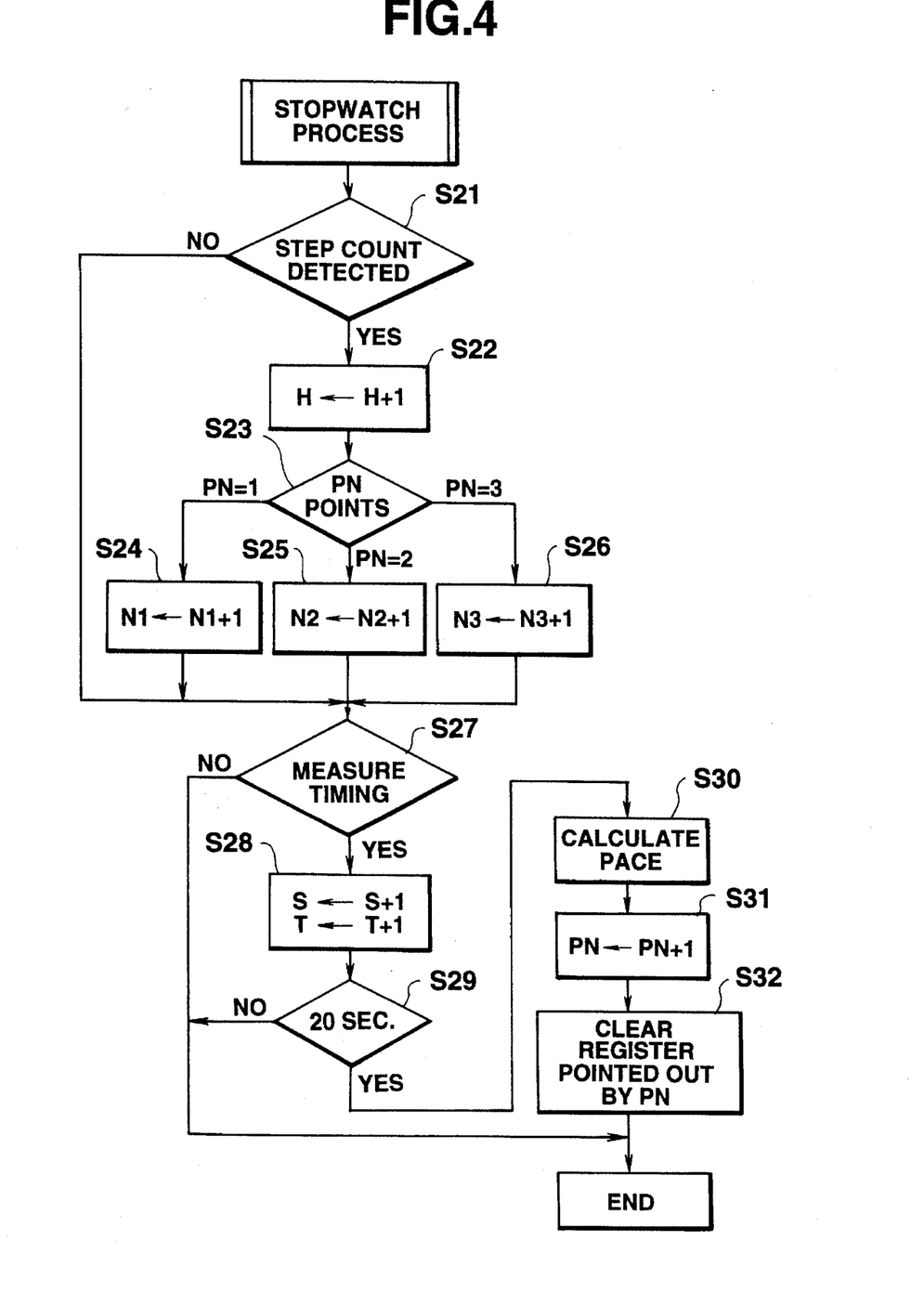
FIG. 4 is a flowchart indicative of a stopwatch process performed in the pace display device.

The stopwatch process will be described with respect to a flowchart of FIG. 4. First, at step S21 the controller 3 determines whether a step count detection signal is being output from the step count detector 5. If so, at step S22 the controller 3 increments by one the step count, the data on which is stored in the register H. At step S23, the controller 3 determines which of the registers N1, N2 and N3 the pointer PN points out. The pointer PN is incremented by one at intervals of 20 seconds. When PN=1, the pointer PN points out the register N1 which stores data on a step count for a first one of 20-second time divisions of one minute; when PN=2, the pointer PN points out the register N2 which stores data on a step count for the next 20-second time division; and when PN =3, the pointer PN points out the register N3 which stores data on a step count for the further next 20-second time division.

When at the determination of step S23 the pointer PN points out the register N1, control passes to step S24, where the controller 3 increments the step count in the register N1 by one; when the pointer PN points out the register N2, control passes to step S25, where the controller 3 increments the step count in the register N2 by one; and when the pointer PN points out the register N3, control passes to step S26, where the controller 3 increments the step count in the register N3 by one.

At step S27 the controller 3 determines whether the signal is a measurement timing one for each second. If so, at the next step S28 the controller 3 increments by one the value in the stopwatch register S and the value of the register T which stores the lap time data. At step S29 the controller 3 determines whether the signal is a pace measurement timing one generated at intervals of 20 seconds. If so, the controller 3 performs a pace calculating process at step S30 in which the controller 3 adds the step counts for the first, next and further next 20-second time divisions stored in the registers N1, N2 and N3 to obtain data on a pace per minute.

The addition of the respective step counts for the three 20-second time divisions of one minute to calculate the pace serves to display data on an accurate pace without amplification of possible errors involved in the measured step counts for the respective 20-second time divisions as well as data on an accurate pace following a change in the actual running speed even when the running speed changes rapidly.

When twenty or forty seconds have elapsed since the start of the stopwatch measurement, no data on step counts is stored in the registers N2 and N3 or in the register N3. Therefore, the count in the register N1 is multiplied by three or the sum of the counts in the registers N1 and N2 is multiplied by 3/2, in order to calculate a step count per minute.

When the pace calculation process at step S30 ends and data on the step count for the 20-second time division is stored in the appropriate register, control passes to step S31, where the controller 3 increments the count of the pointer PN by one to thereby point out the next register. When the value of the pointer PN is 3 at step S31, the value of the pointer PN returns to 1. At the next step S32, the controller 3 clears the register pointed out by the pointer PN.

Referring back to FIG. 3, if the operational mode at this time is a time display one in the display process at step S5, the controller 3 displays data on a date and data on the current time. If it is the stopwatch mode, data on the stopwatch measured time, the lap time and the pace is displayed.

If the controller 3 senses a key operation signal in a halt state, control passes to step S6, where the controller 3 determines whether the key K1 has been operated. If so, control passes to step S7, where the controller 3 changes the value of the mode register M from "1" to "0" or vice versa.

If the operated key is not the key K1 at the determination of step S6, control passes to step S8, where the controller 3 determines whether the key K2 has been operated. If so, control passes to step S9, where the controller 3 determines whether the flag F is "1". If so, it implies that the key K2 has been operated during the stopwatch measurement, in which case control passes to step S10, where the controller 3 changes the flag F to "0". If the flag F is "0" at the determination of step S9, control passes to step S11, where the controller 3 changes the flag F to "1" to start the stopwatch measurement and simultaneously clears the respective registers used in the immediately preceding measurement.

If the operated key is not the key K2 at the determination of step S8, control passes to step S12, where the controller 3 determines whether the key K3 has been operated. If so, control passes to step S13, where the controller 3 determines whether the flag F is "1" or whether the stopwatch measurement is being made. If so, the controller 3 performs the lap process at step S14.

Figure 5:
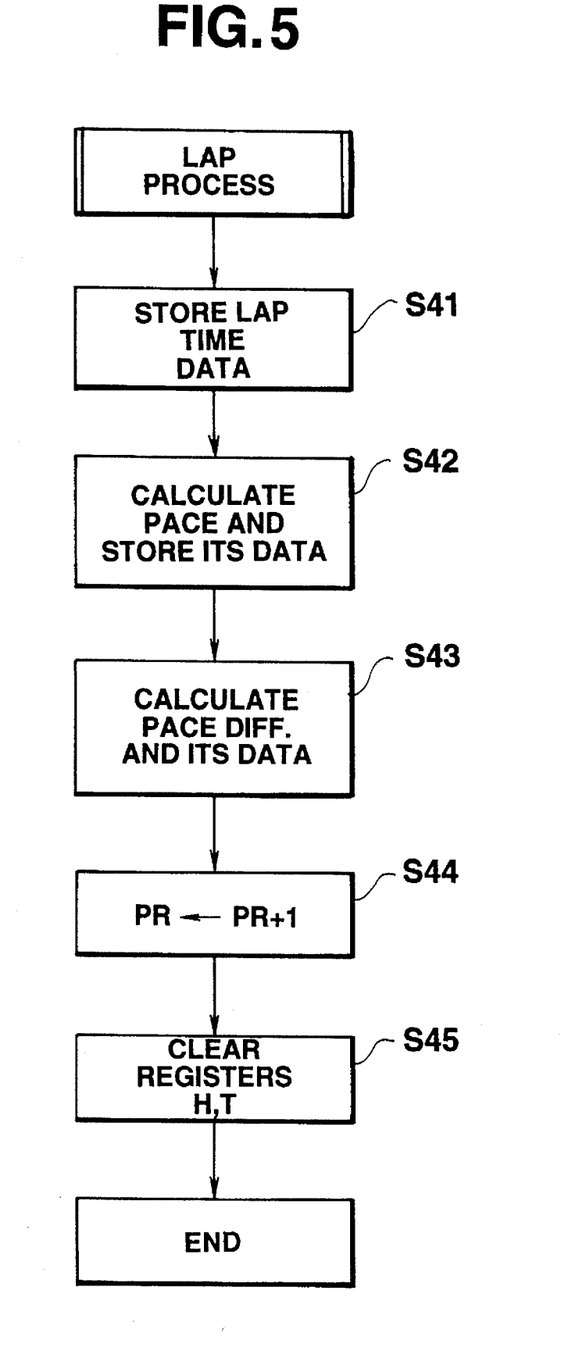
FIG. 5 is a flowchart indicative of a lap process performed in the pace display device.

FIG. 5 is a flowchart indicative of the contents of the lap process. First, at step S41 data on the lap time in the register T is stored in the register, for example, register R1, pointed out by the pointer PR. At the next step S42 the controller 3 calculates an average pace through the section of the course on the basis of data on the step count stored in the register H and data on the lap time stored in the register T and stores the data on the average pace in the register R1. At step S43 the controller 3 calculates the pace difference between data on the average pace through the present section and data on the immediately preceding average pace stored in the register R0, and stores data on the pace difference in the appropriate register R1.

Thus, since data on the lap time and data on the average pace for that section of the course and data on the pace difference concerned are stored in the register R1, control passes to step S44, where the controller 3 increments the value of the pointer PR by one to thereby point out the next lap register. Since the measurement of data on the step count and lap time for that section has ended, control passes to step S45, where the controller 3 clears the registers H and T.

By calculating and displaying the pace difference between the present and immediately preceding sections of the running course, as just described above, the runner is able to confirm how fast or low the present pace is compared to the immediately preceding pace. As will be described later, after the stopwatch measurement ends, data items on the average pace, pace difference and lap time for the respective sections are displayed in order of section, so that the contents of the running can be analyzed with more precisely.

Referring back to FIG. 3, if the determination at step S12 is NO, control passes to step S15, where the controller 3 determines whether the key K4 has been operated. If so, control passes to step S16, where the controller 3 determines whether the flag F is "1". If so, and the key K4 has been operated during the stopwatch measurement, the controller 3 performs the pace difference process at step S17, which involves display of the difference between the pace at that time in the course of the current lap and the immediately preceding average pace for the immediately preceding lap for a given period of time. If the key K4 has not been operated, the controller 3 performs a process involving the operation of another key at step S18, which includes display of data stored in the registers R0, R1, R2, . . . by the operation of the key K5 on the display 10. That is, if the key K5 is operated when no stopwatch measurement is being made (F=0) in the stopwatch mode (M=1), the controller 3 reads data stored in the registers R0, R1, R2, . . . and displays those data on the display 10.

Figure 6:
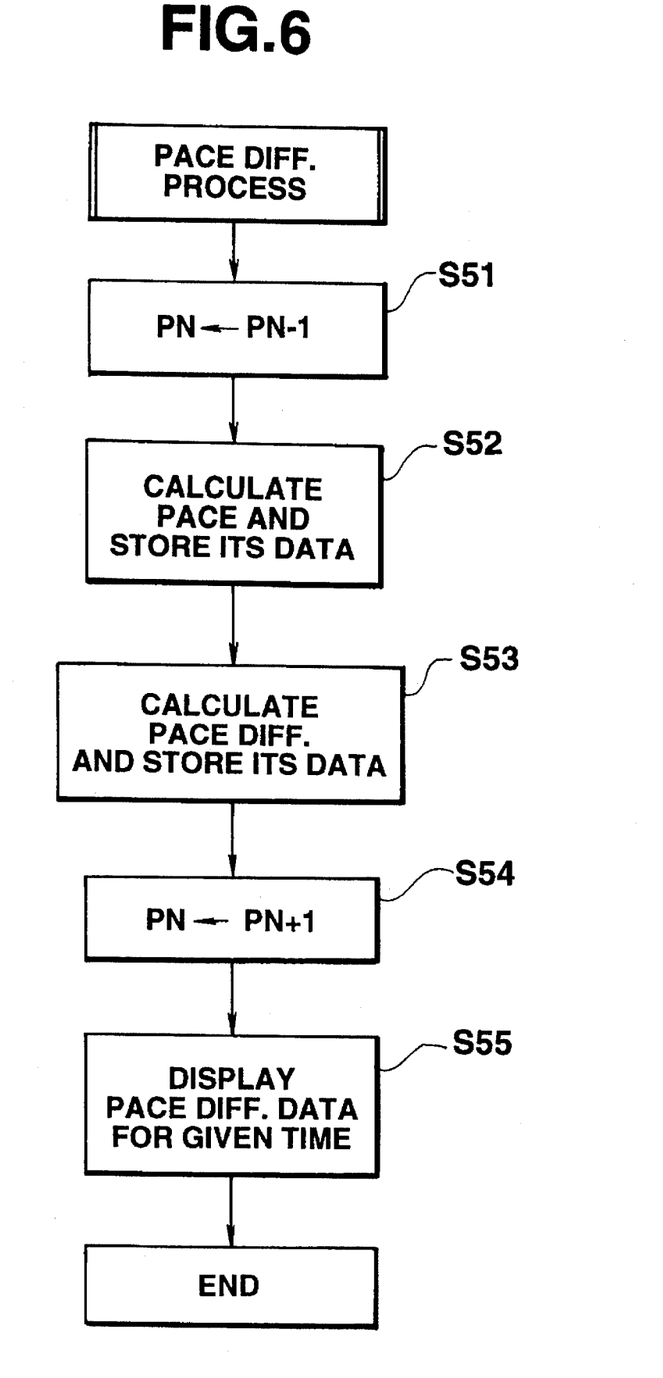
FIG. 6 is a flowchart indicative of a pace difference process performed in the pace display device.

FIG. 6 is a flowchart indicative of the pace difference process. First, at step S51 the controller 3 decrements the value of the pointer PN by one to thereby point out the register which stores data on the step count for the immediately preceding 20-second time division because the data on the step count is now under measurement and data on the step count for the immediately preceding 20-second time division has not yet stored in the register Ni designated by the pointer PN. At the next step S52 the controller 3 calculates the present pace on the basis of data on the register Ni pointed out by the changed pointer PN and the data on the step count in the remaining register Nj.

For example, if at present the register used in the measurement of the step count is the register N2, the controller 3 decrements the value in the pointer PN by one to point out the register N1 which stores data on the step count for the immediately preceding 20-second time division, and adds the step counts stored in the registers N1 and N3. The controller 3 then multiplies the result of the addition by 3/2 to calculate a pace per minute and stores data on the pace in the register 23.

At the next step S53 the controller 3 calculates the difference between the average pace through the immediately preceding section stored in the lap register and the present pace and stores data on the pace difference in the register 24, which implies the termination of the calculation of the difference in pace between the present and the immediately preceding sections. Therefore, the controller 3 increments the count in the pointer PN by one to return the pointer to its initial state at step S54. Thereafter, at step S55 the controller 3 displays data on the difference in pace between the present and the immediately preceding sections for a given time.

Figure 7:
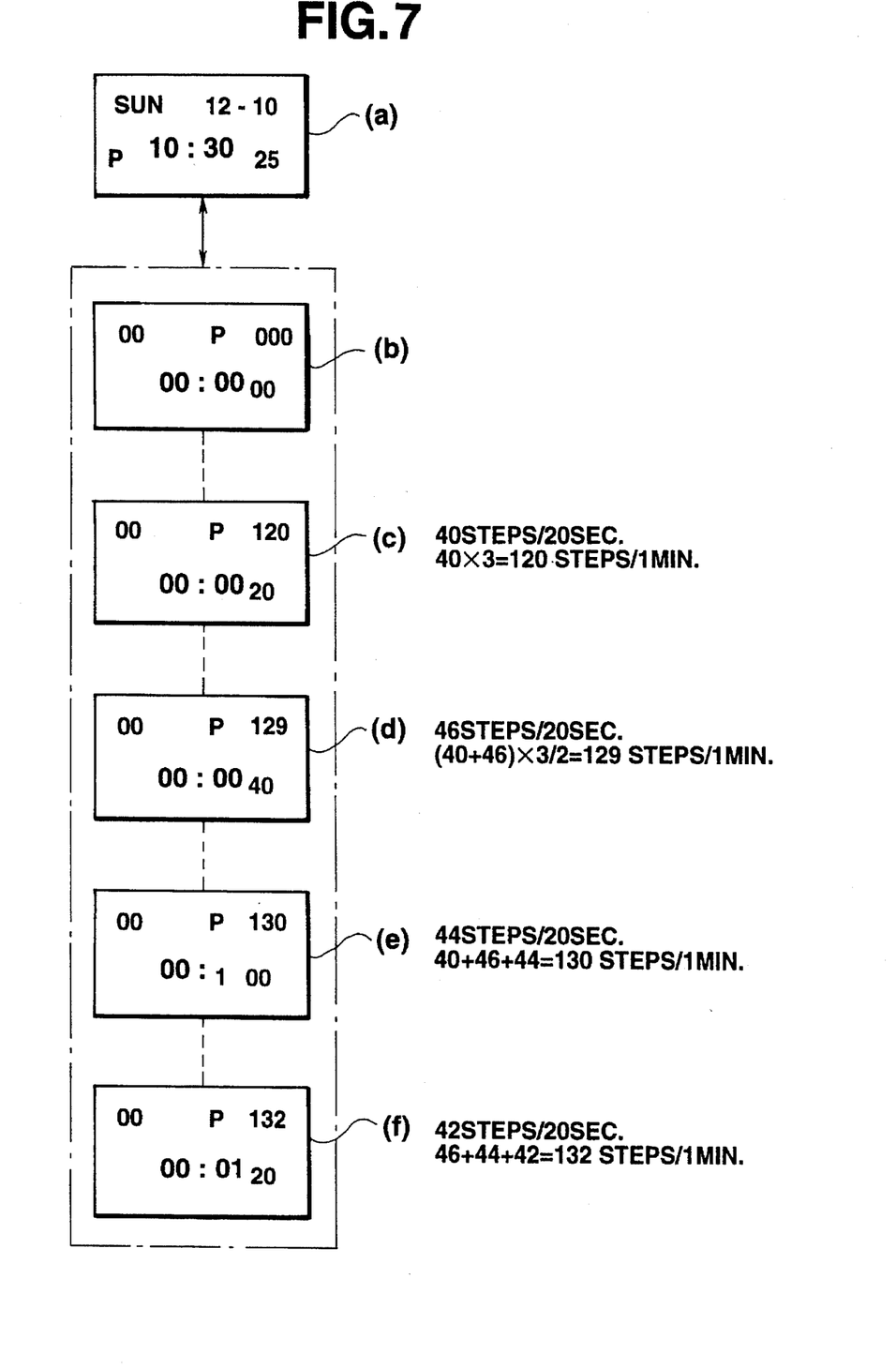
FIG. 7 shows one example of display of pace data on the pace display device.

One example of calculation and display of a pace from data on the step count for each 20-second time division will be described next with reference to FIG. 7.

When the key K1 is operated in the time display mode of FIG. 7(a), the operation mode is switched to the stopwatch mode of FIG. 7(b), so that the initial values "0" of the lap time and the pace data are displayed. When the key K2 is operated to start the stopwatch measurement under this situation and the step count for the first 20-second time division is "40", the controller 3 displays as the present pace data the step count "120" per minute obtained by multiplication of the step count "40" by three, and data on the stopwatch measured time "20 seconds" simultaneously, as shown in FIG. 7(c).

When the step count for the next 20-second time division is "46", the controller 3 displays data on the step count "129" per minute obtained by the addition of the step count "40" for the first 20-second time division and the step count "46" for the next 20-second time division and multiplication of the added value by 3/2 as data on the current pace, and data on the stopwatch measured time as "40 seconds" simultaneously, as shown in FIG. 7(d).

When the step count for the further next 20-second time division is "44", the controller 3 displays as the current pace data on the step count "130" per minute obtained as the result of the addition of the step count "40" for the first 20-second time division, the step count "46" for the next 20-second time division and the step count "44" for the further next 20-second time division, and data on the stopwatch measured time "one minute" at that time simultaneously, as shown in FIG. 7(e).

When the step count for the still further next 20-second time division is "42", the controller 3 stores data on the step count "42" counted this time in the register N1 where the oldest one of the data items is stored among the registers N1–N3. The controller 3 then adds the step count "42" for the newest 20-second time division, the step count "44" for the immediately preceding 20-second time division and the step count "46" for the further preceding 20-second time division to obtain the step count "132" for per minute, displays the step count "132" as data on the present pace, and data on the stopwatch measured time "01 (minute) 20 (seconds)" at that time simultaneously, as shown in (f) of FIG. 7.

As described above, in the present embodiment, data items on the step counts for the respective 20-second time divisions are stored sequentially in the three registers N1–N3, and a step count per minute is calculated on the basis of the data on the step counts stored in the three registers N1–N3 each time the measurement of a step count for the 20-second time division ends. Therefore, data on the newest pace for each 20-second time division is obtained at all times. In addition, the controller 3 calculates not only data on the step count for the newest 20-second time division but also data on the step count for the immediately preceding 20-second time division, and data on the step count for the further preceding 20-second time division, so that even when errors are involved in the step counts for the 20-second time durations, they are not amplified when the pace is calculated to thereby display an accurate pace data compared to the conventional device.

Figure 8:
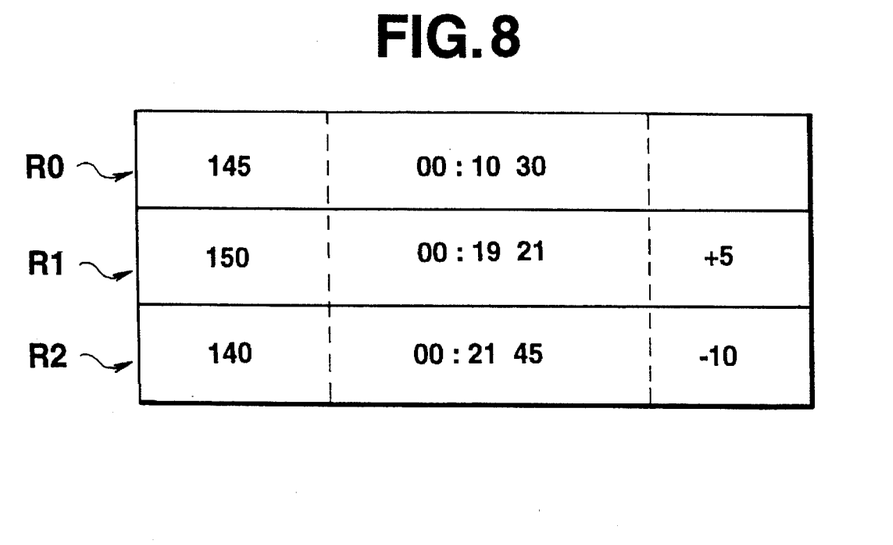
FIG. 8 shows one example of data stored in a lap time register of the pace display device.

One example of display of data on a pace difference for each of sections of the running course will be described next with respect to FIGS. 8, 9 and 10. Data on an average pace, lap time, and pace difference for each of sections of the course is stored in a respective one of the lap registers R0–R2, as shown in FIG. 8. For example, "140/minutes" as data on the average pace, "21 (minutes) 45 (seconds)" as data on the lap time and "–10" as data on the pace difference are stored in the third lap register R2.

Figure 9:
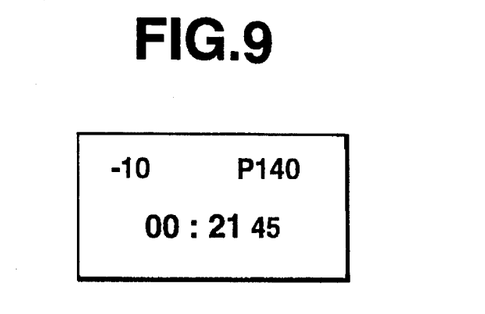
FIG. 9 shows one example of a display appearing when the lap time measurement is completed in the pace display device.

FIG. 9 shows an illustrative display obtained when the third lap measurement has ended and where data on the pace difference "–10" between the present average pace "140/minute" and the average pace for the immediately preceding lap is displayed.

Figure 10:
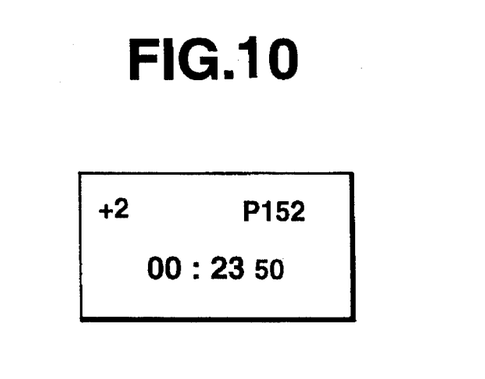
FIG. 10 shows one example of a display appearing during the measurement of a lap time in the pace display device.

FIG. 10 shows an illustrative display obtained when the key K4 has been operated during the measurement of the lap time. The controller 3 calculates the pace from data on the pace stored in the register N1, N2 or N3 when the key K4 is operated, and displays the pace difference "+2" between the pace "152/minute" and the average pace for the immediately preceding lap.

The inventive pace display device is not limited to ones of the wristwatch type mentioned in the embodiment, but may be applied to ones worn on the runner's side or to a special-purpose device which displays the lap time, pace or pace difference.

While in the embodiment data on the step counts obtained for the respective 20-second measurement time divisions are stored in the three registers N1, N2 and N3, the measurement time may be any length of time such as 5 or 10 seconds. When the length of measurement time is set at 5 seconds, 12 registers are required to store data on the step counts while when the length of measurement time is set at 10 seconds, 6 registers are required.

The pace display device of the embodiment may be modified slightly so as to display a rapidly changing pace, if any.

For example, the controller determines whether the step count measured for a 20-second time division is larger than a predetermined value X. If so, the controller calculates a pace by reduction of the measured step count to a step count per minute, and displays data on the pace. When the step count measured is less than the predetermined value X, the controller adds the step counts, data on which is stored in the three registers N1, N2 and N3, to obtain a pace, as described in the embodiment, and displays data on the pace. Also, in this case, the length of step measuring time may be set at an appropriate time such as 5 or 10 seconds and not at 20 seconds.

What is claimed is:

1. A pace display device comprising:

step sensing means for sensing steps taken by an exerciser in each of a plurality of sections of a jogging course to obtain step number data;

timekeeping means for measuring a lap time required by the exerciser to complete each section of the plurality of sections of the jogging course;

pace calculating means for calculating an average pace for each of the plurality of sections of the jogging course on the basis of step number data obtained by said step sensing means and the lap time measured by said timekeeping means;

first storage means for storing the average pace for each of the plurality of sections of the jogging course calculated by said pace calculating means;

pace difference calculating means for calculating a pace difference between an average pace for two adjacent sections of the jogging course stored in said first storage means;

second storage means for storing the pace difference calculated by said pace difference calculating means, in correspondence with one of the average paces used to calculate said pace difference; and display means for displaying the average pace stored in said first storage means and the pace difference stored in said second storage means, which average pace was used by said pace difference calculating means to calculate said pace difference.

2. A pace display device according to claim 1, further comprising: third storage means for storing the lap time measured by said timekeeping means, in correspondence with the average pace stored in said first storage means, which lap time was used by said pace calculating means to calculate said average pace for each section; and wherein said display means also displays the lap time stored in said third storage means, said lap time stored in said third storage means being the same time used to calculate said average pace, and said average pace being used to calculate said pace difference.

3. A pace display device according to claim 2, further comprising:

input means for inputting a read-out instruction signal;

display control means, responsive to the read-out instruction signal from said input means, for controlling said display means to display the average pace stored in said first storage means, the pace difference stored in said second storage means and the lap time stored in said third storage means, said lap time stored in said third storage means being used to calculate said average pace, and said average pace being used to calculate said pace difference.

4. A pace display device comprising:

step counting means for counting steps taken by an exerciser to obtain step number data;

time counting means for counting a lap time;

step number storage means for successively storing step number data obtained by said step counting means each time said time counting means counts a predetermined time duration, the predetermined time duration being equivalent to a time duration obtained by dividing a unit time by a predetermined number;

pace calculating means for summing up said successively stored step number data stored in said step number storage means each time said time counting means counts the predetermined time duration, to calculate a number of steps taken by the exerciser during the last unit time, whereby pace data representing a number of steps taken by the exerciser during the last unit time is obtained; and display means for displaying the pace data obtained by said pace calculating means each time said time counting means counts the predetermined time duration.

5. A pace display device according to claim 4, wherein said display means displays the pace calculated by said pace calculating means together with the time duration counted by said time counting means.

6. A pace display device comprising:

step counting means for counting steps taken by an exerciser who jogs along a jogging course that includes several sections to obtain step number data representative of a number of steps taken by said exerciser in each section;

time counting means for counting an elapsed time;

average pace calculating means for calculating an average pace for each section of the jogging course from the elapsed time counted by said time counting means and the step number data obtained by said step counting means;

average pace storage means for storing the average pace calculated by said average pace calculating means;

step-number storage means for successively storing step number data which have been obtained by said step counting means every time said time counting means counts a predetermined elapsed time;

externally operable means;

pace calculating means for calculating a number of steps taken by the exerciser in a unit time from step number data stored in said step-number storage means, when said externally operable means is operated, whereby pace data representative of a number of steps taken by said exerciser, for each unit time is obtained;

pace difference calculating means for calculating a pace difference between the average pace stored in said average pace storage means and the pace data calculated by said pace calculating means; and display means for displaying the pace difference calculated by said pace difference calculating means and the pace data obtained by said pace calculating means.

* * * * *